US008171089B2

(12) United States Patent
Nersu et al.

(10) Patent No.: US 8,171,089 B2
(45) Date of Patent: May 1, 2012

(54) PRIVILEGED AND RESTRICTED EMAIL PROCESSING TO MULTIPLE RECIPIENTS BASED ON SENDER DEFINED VISIBILITY SETTINGS

(75) Inventors: Harshita Nersu, Navan (IE); Kalyan Nersu, Navan (IE)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 12/179,721

(22) Filed: Jul. 25, 2008

(65) Prior Publication Data

US 2010/0023585 A1 Jan. 28, 2010

(51) Int. Cl.
G06F 15/16 (2006.01)
(52) U.S. Cl. ....................................................... 709/206
(58) Field of Classification Search ................... 709/206
See application file for complete search history.

(56) References Cited

U.S. PATENT DOCUMENTS

| | | | | |
|---|---|---|---|---|
| 7,120,670 B2 * | 10/2006 | Aikawa et al. | ................. | 709/206 |
| 7,130,887 B2 * | 10/2006 | Goldberg | ..................... | 709/206 |
| 7,269,621 B2 | 9/2007 | Chang et al. | | |
| 7,293,171 B2 * | 11/2007 | Batthish et al. | ................. | 713/152 |
| 7,546,388 B2 * | 6/2009 | Yamamura | ......................... | 710/8 |
| 7,761,516 B2 * | 7/2010 | Mason et al. | .................. | 709/206 |
| 2002/0110227 A1 | 8/2002 | Bedingfield et al. | | |
| 2004/0078488 A1 | 4/2004 | Patrick | | |
| 2008/0005355 A1 | 1/2008 | Craft et al. | | |
| 2009/0113001 A1 * | 4/2009 | Manning et al. | ............... | 709/206 |

* cited by examiner

Primary Examiner — Duyen Doan
(74) Attorney, Agent, or Firm — Cantor Colburn LLP; Ayla Lari (57) ABSTRACT

A method is provided for email processing to recipients based on user defined visibility settings. Input of email addresses for recipients in a privileged list and for recipients not in the privileged list is received. An email message is transmitted to recipients in the privileged list and to recipients not in the privileged list. The recipients in the privileged list are able to visibly distinguish recipients in the privileged list from the recipients not in the privileged list. The recipients not in the privileged list are unable to visibly distinguish the recipients in the privileged list. Input of email addresses for recipients in a restricted list and for recipients not in the restricted list is received. An email message is transmitted to recipients in the restricted list and to recipients not in the restricted list. Recipients in the restricted list are unable to visibly see recipients in the restricted list.

4 Claims, 8 Drawing Sheets

| TO | Peter, Henry |
| --- | --- |
| GL TO | Maria |
| CC | Mark |
| GL CC | Joe |
| BCC | Kathy |
| GL BCC | Andre |
| Subject | Innovative Ideas |

Sender's View 300

FIG. 4

| TO | Peter, Maria (GL), Henry |
| --- | --- |
| CC | Mark, Joe (GL) |
| BCC | Kathy, Andre (GL) |
| Subject | Innovative Ideas |

Sender's View 400

FIG. 5

| TO | Peter, Maria, Henry |
|---|---|
| CC | Mark, Joe |
| BCC | [Not seen: Kathy, Andre] |
| Subject | Innovative Ideas |

505 — TO
510 — CC
515 — BCC

Normal View 500

FIG. 6

| TO | Peter, Maria, Henry |
|---|---|
| CC | Mark, Joe |
| BCC | [Not seen: Kathy,] Andre |
| Subject | Innovative Ideas |

605 — TO
610 — CC
615 — BCC 620, 625, 630

Green List View 600

FIG. 9

Inconsistency with Red List!

WARNING: Ewa is in both the Red List and Green List. Do you want to change settings?

[YES]   [NO]

Warning 900

FIG. 8

| | GREEN LIST |
|---|---|
| ☐ | Ewa |
| ■ | Ronan |
| ■ | Christian |
| ☐ | Fiona |
| ☐ | Eileen |
| ☐ | David |
| ■ | Alex |
| ☐ | |

805 — (header row)
810 — Ewa
815 — Ronan
820 — Christian
825 — Fiona
830 — Eileen
835 — David
840 — Alex Green List 800

FIG. 7

| | RED LIST |
|---|---|
| ☐ | Ewa |
| ■ | Ronan |
| ☐ | Christian |
| ☐ | Fiona |
| ■ | Eileen |
| ■ | David |
| ☐ | Alex |

705 — (header row)
710 — Ewa
715 — Ronan
720 — Christian
725 — Fiona
730 — Eileen
735 — David
740 — Alex Red List 700

PRIVILEGED AND RESTRICTED EMAIL PROCESSING TO MULTIPLE RECIPIENTS BASED ON SENDER DEFINED VISIBILITY SETTINGS

TRADEMARKS

IBM® is a registered trademark of International Business Machines Corporation, Armonk, N.Y., U.S.A. Other names used herein may be registered trademarks, trademarks or product names of International Business Machines Corporation or other companies.

TECHNICAL FIELD

Exemplary embodiments of the invention relate to communications, and particularly to electronic communications which provide variable options for email processing while still protecting the privacy of recipients.

DESCRIPTION OF BACKGROUND

To send an electronic communication, such as electronic mail (email), a sender typically composes the email message and addresses that message to one or more recipients. In addressing an email message, an email composition application may provide a sender with an option to select to send the email to some recipients as direct recipients (TO), some recipients as a carbon copy (CC), and to other recipients as a blind carbon copy or blank carbon copy (BCC). In handling distribution of an email, an email service sends a copy of the email to all the addressees, but does not disclose the BCC recipient's address in the copy of the email received by any other recipients of the same email. In another example, an email composition application or email service may not offer a BCC option, but may provide other options for a sender to request to "hide" one or more recipients of the email by blocking other recipients from seeing that the email was sent to the hidden recipients.

There are many reasons that a sender may wish to use an option to hide one or more recipients of the email from the other recipients of the same email when addressing an email message. For example, as a courtesy to recipients, a sender may use an option for hiding recipients to an email to protect the security of the email address of each recipient. In another example, a sender may use an option for hiding email recipient addresses so that hidden recipients may anonymously monitor the email. For example, a sender may want to add a boss or an administrator as an addressee of an email communication, to allow monitoring of the email communication, without disclosing that the email is being monitored.

A limitation of email services that provide an option to hide one or more recipients of an email is that when the hidden recipient selects to respond to that email, such as selecting to reply all, the hidden recipient is not able to reply to the other recipients, such as TO recipients, CC recipients, and BCC recipients.

SUMMARY OF EXEMPLARY EMBODIMENTS

In accordance with exemplary embodiments, a method is provided for electronic mail (email) processing to multiple recipients based on user defined visibility settings. Input of email addresses for recipients in a privileged list is received. Input of email addresses for recipients not in the privileged list is received. An email message is transmitted to recipients in the privileged list and to recipients not in the privileged list. In response to receiving the email message, the recipients in the privileged list are able to visibly distinguish recipients in the privileged list from the recipients not in the privileged list. In response to receiving the email message, the recipients not in the privileged list are unable to visibly distinguish the recipients in the privileged list from the recipients not in the privileged list.

In accordance with exemplary embodiments, a method is provided for electronic mail (email) processing to multiple recipients based on user defined visibility settings. Input of email addresses for recipients in a restricted list is received. Input of email addresses for recipients not in the restricted list is received. An email message is transmitted to recipients in the restricted list and to recipients not in the restricted list. In response to receiving the email message, the recipients in the restricted list are unable to visibly see other recipients in the restricted list. Also, in response to receiving the email message, the recipients not in the restricted list cannot distinguish recipients in the restricted list from the recipients not in the restricted list.

System and computer program products corresponding to the above-summarized methods are also described herein.

Additional features are realized through the techniques of exemplary embodiments. Exemplary embodiments of the invention are described in detail herein and are considered a part of the claimed invention. For a better understanding of features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features are apparent from the following detailed description taken in conjunction with the accompanying drawings in which:

The detailed description explains exemplary embodiments, together with features, by way of example with reference to the drawings.

DETAILED DESCRIPTION OF EXEMPLARY EMBODIMENTS

Exemplary embodiments provide methods and systems which allow privileged email processing to multiple recipients based on user defined visibility settings and/or as an inbuild feature in an email client.

In one case, a situation may arise where an email has been sent to multiple recipients addressed in TO, CC, and BCC fields. Two-way communication is restricted to only recipients in the TO and CC fields. Recipients who were BCCed are left outside the loop. Also, sometimes the sender may input addresses in the TO, CC, and BCC fields out of some obligation, but the sender may not in reality mind a few of the recipients in the TO, CC, and BCC fields to know who is BCCed. With existing systems, BCCed recipients cannot use a reply to all function, i.e., to reply to all the addressees in TO, CC, and BCC fields of the original email. For a BCCed recipient using existing systems, two-way communication is possible only with the sender of the original email.

However, in accordance with exemplary embodiments, mechanisms are provided to permit the BCCed recipient to use a reply to all function, which allows the BCCed recipient to reply to all recipients (in a predefined group) and still protect the email privacy as intended by the initial sender of the email. The predefined groups may include individuals (e.g., names or email addresses) who are in a restricted group (e.g., red list) and individuals who are in an unrestricted group (e.g., green list) or any combination, as discussed further herein.

In another case, a sender may forward emails to certain recipients by mistake but the sender wants to protect the identity of emails (e.g., in a string of emails) forwarded by certain other individuals. By adhering to user created rules, exemplary embodiments can help avoid such situations where the identities of certain individuals can be revealed in forwarded email messages.

Figure 1:
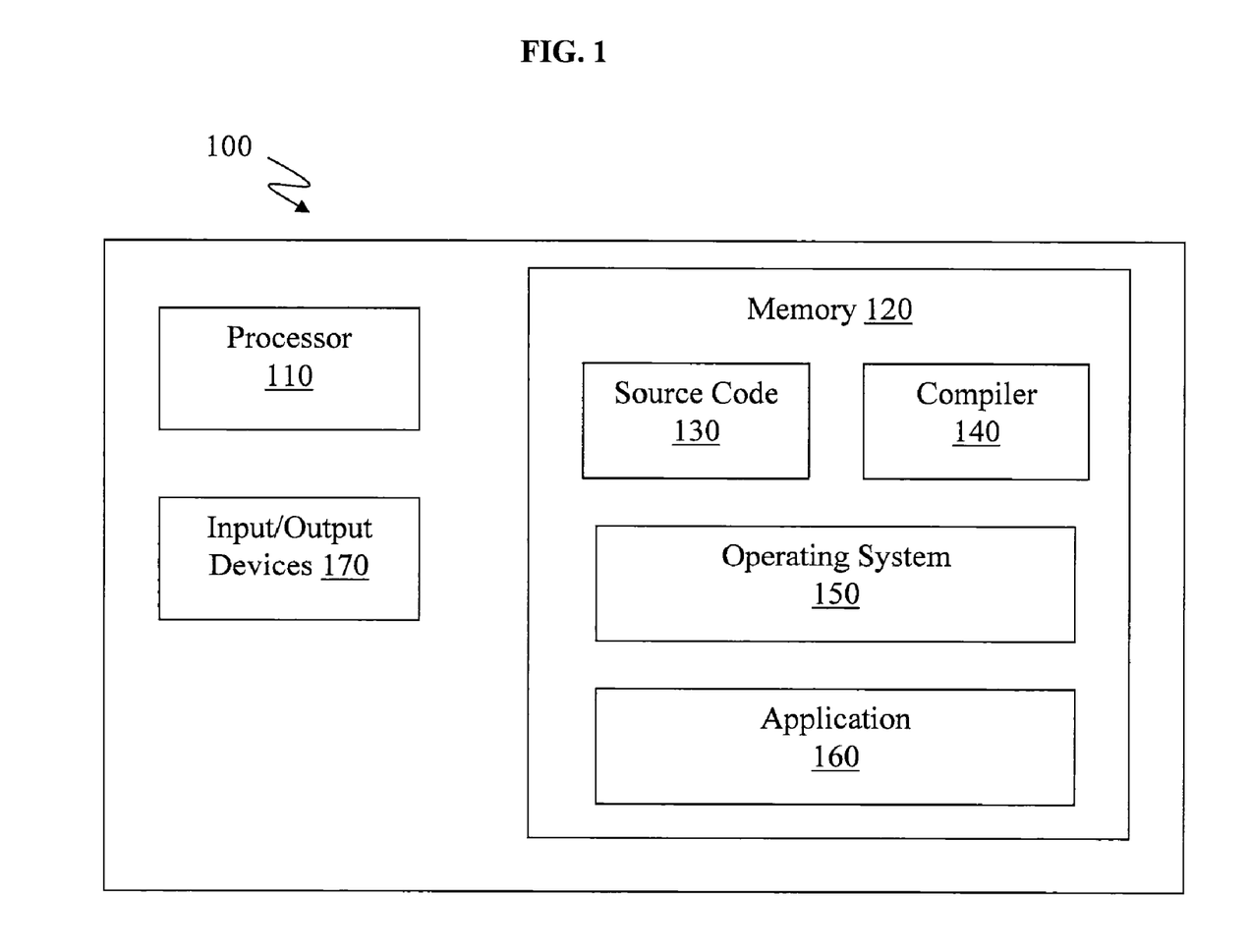
FIG. 1 illustrates an example of a computing device having capabilities, which may be utilized by exemplary embodiments.

FIG. 1 illustrates an example of a computing device 100 having capabilities, which may be utilized by exemplary embodiments. Various operations discussed herein may also utilize the capabilities of the computing device 100. One or more of the capabilities of the computing device 100 may be incorporated in any element, module, application, and/or component discussed herein.

The computing device 100 includes, but is not limited to, PCs, workstations, laptops, PDAs, palm devices, servers, storages, communication devices, and the like. Generally, in terms of hardware architecture, the computing device 100 may include one or more processors 110, memory 120, and one or more input and/or output (I/O) devices 170 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 110 is a hardware device for executing software that can be stored in the memory 120. The processor 110 can be virtually any custom made or commercially available processor, a central processing unit (CPU), a data signal processor (DSP), or an auxiliary processor among several processors associated with the computing device 100, and the processor 110 may be a semiconductor based microprocessor (in the form of a microchip) or a macroprocessor.

The memory 120 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 120 may incorporate electronic, magnetic, optical, and/or other types of storage media. Note that the memory 120 can have a distributed architecture, where various components are situated remote from one another, but can be accessed by the processor 110.

The software in the memory 120 may include one or more separate programs, each of which comprises an ordered listing of executable instructions for implementing logical functions. The software in the memory 120 includes a suitable operating system (O/S) 150, compiler 140, source code 130, and application 160 in accordance with exemplary embodiments. As illustrated, the application 160 comprises numerous functional components for implementing the features and operations of the exemplary embodiments. The application 160 of the computing device 100 may represent various applications, computational units, logic, functional units, processes, operations, virtual entities, clients, and/or modules in accordance with exemplary embodiments, but the application 160 is not meant to be a limitation.

The operating system 150 controls the execution of other computer programs, and provides scheduling, input-output control, file and data management, memory management, and communication control and related services. It is contemplated by the inventors that the application 160 for implementing exemplary embodiments may be applicable on all commercially available operating systems.

The application 160 may be a source program, executable program (object code), script, or any other entity comprising a set of instructions to be performed. When a source program, then the program is usually translated via a compiler (such as the compiler 140), assembler, interpreter, or the like, which may or may not be included within the memory 120, so as to operate properly in connection with the O/S 150. Furthermore, the application 160 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 170 may include input devices such as, for example but not limited to, a mouse, keyboard, scanner, microphone, camera, etc. Furthermore, the I/O devices 170 may also include output devices, for example but not limited to a printer, display, etc. Additionally, the I/O devices 170 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 170 also include components for communicating over various networks, such as the Internet or intranet.

If the computing device 100 is a PC, workstation, intelligent device or the like, the software in the memory 120 may further include a basic input output system (BIOS) (omitted for simplicity). The BIOS is a set of essential software routines that initialize and test hardware at startup, start the O/S 150, and support the transfer of data among the hardware devices. The BIOS is stored in some type of read-only-memory, such as ROM, PROM, EPROM, EEPROM or the like, so that the BIOS can be executed when the computing device 100 is activated.

When the computing device 100 is in operation, the processor 110 is configured to execute software stored within the memory 120, to communicate data to and from the memory 120, and to generally control operations of the computing device 100 pursuant to the software. The application 160 and the O/S 150 are read, in whole or in part, by the processor 110, perhaps buffered within the processor 110, and then executed.

When the application 160 is implemented in software it should be noted that the application 160 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 160 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 160 is implemented in hardware, the application 160 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
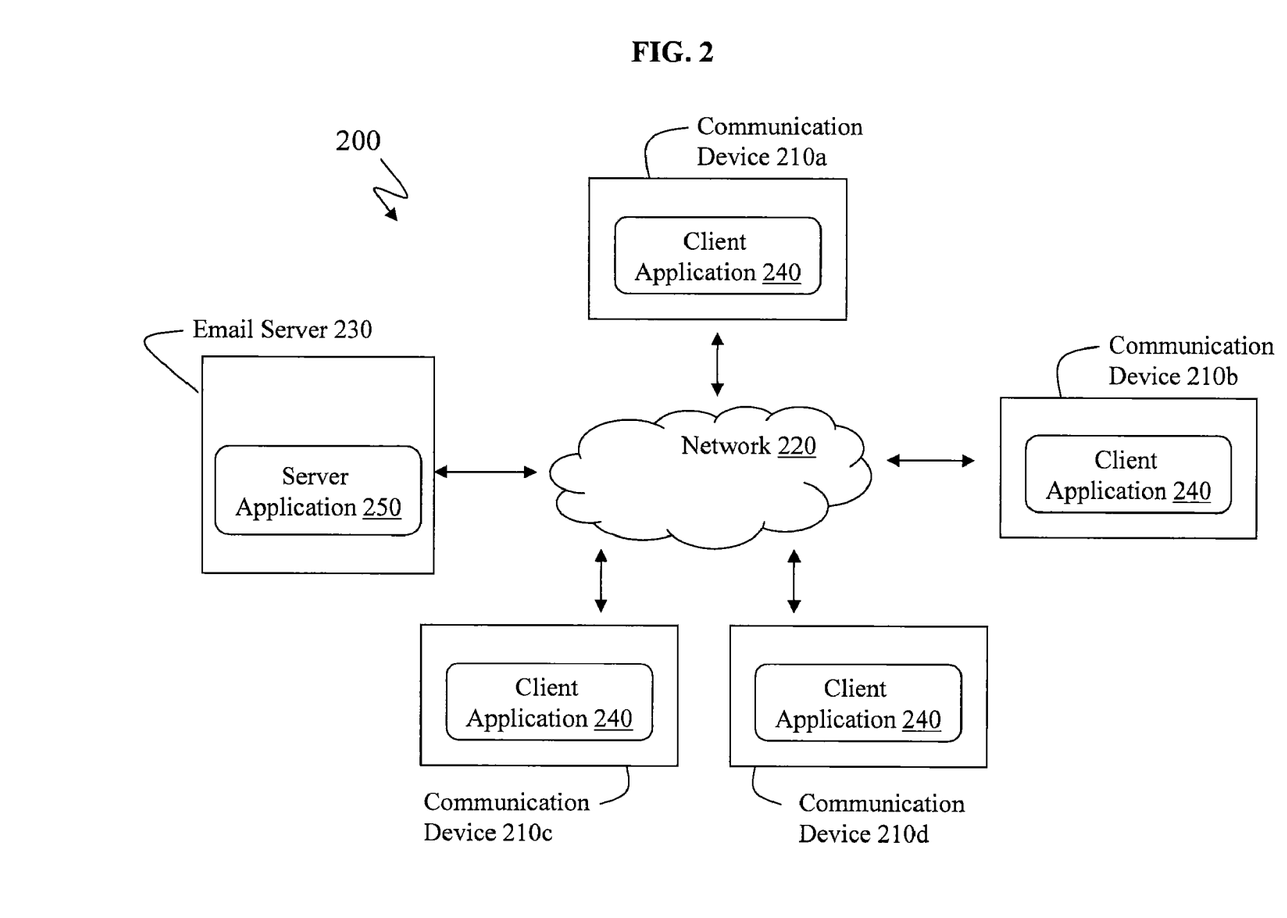
FIG. 2 illustrates a system in which exemplary embodiments may be implemented.

FIG. 2 illustrates a system 200 in which exemplary embodiments may be implemented. The system 200 may include multiple communication devices 210a, 210b, 210c, and 210d, and additional communication devices may be included. The communication devices 210a, 210b, 210c, and 210d are operatively connected to a network 220. The communication devices 210a, 210b, 210c, and 210d may operatively connect via the network 220 to multiple communication servers, such as an email server 230. The email server 230 may operatively connect to and interact with one or more other servers (not shown for the sake of clarity) for transmitting and receiving communications (such as emails) over the network 220.

The communication devices 210a, 210b, 210c, and 210d may each include a client application 240 in accordance with exemplary embodiments. The email server 230 may include a server application 250 in accordance with exemplary embodiments. The client application 240 and the server application 250 may operatively connect according to a client-server architecture via the network 220. The client application 240 and the server application 250 are configured to share the responsibilities, functions, and operations of implementing exemplary embodiments. Also, the client application 240 may be a thin client and/or a thick client according to exemplary embodiments.

Additionally, the network 220 may include circuit-switched and/or packet-switched technologies and devices, such as routers, switches, hubs, gateways, etc., for facilitating communications. The network 220 may include wireline and/or wireless components utilizing, e.g., IEEE 802.11 standards for providing over-the-air transmissions of communications. The network 220 can include IP-based networks for communication between a customer service center and clients/users. The network 220 can be representative of countless networks.

In exemplary embodiments, the network 220 can be a managed IP network administered by a service provider, which can control bandwidth and quality of service for the communications discussed herein. The network 220 may be implemented in a wireless fashion, e.g., using wireless protocols and technologies, such as WiFi, WiMax, BLUETOOTH, etc. The network 220 can also be a packet-switched network as a local area network, a wide area network, a metropolitan area network, an Internet network, or other similar types of networks. The network 220 may be a cellular communications network, a fixed wireless network, a wireless local area network (LAN), a wireless wide area network (WAN), a personal area network (PAN), a virtual private network (VPN), an intranet or any other suitable network, and the network 220 may include equipment for receiving and transmitting signals, such as a cell tower, a mobile switching center, a base station, and a wireless access point.

Furthermore, exemplary embodiments are not limited to but are capable of being implemented in the system 200 illustrated in FIG. 2. Additionally, the email server 230 in FIG. 2 may be representative of numerous servers. Likewise, the communication devices 210a, 210b, 210c, and 210d may be representative of numerous communication devices. Therefore, the system 200 illustrated in FIG. 2 is neither limited numerically to the elements depicted therein nor limited to the exact configuration and operative connections of elements. Further, it is understood by those skilled in the art that elements may be added to, subtracted from, or substituted for the elements described in FIG. 2.

Using the client application 240 and server application 250, exemplary embodiments provide the user with options for setting recipient visibility while maintaining privacy. The user has options to select email addresses of recipients to be included in a group, which for illustrative purposes is called a green list (GL), and the recipients in the green list are always allowed to visibly recognize others within the green list. When a communication such as an email is sent by the user to the recipients in the green list, the recipients in the green list can visibly see each other (even BCC recipients in the green list), and the recipients in the green list can reply to each other individually or collectively (e.g., using reply to all). Additionally, BCC recipients in the green list can themselves see other BCC recipients in the green list. The sender may designate the recipients in the green list in advance, and/or the sender may designate the recipients in the green list at the time of inputting email addresses in an address field. Even if various recipients of the green list are in the TO, CC, and BCC fields, each recipient of the green list would recognize (visibly) that other recipients of the green list are respectively in the TO, CC, and BCC fields. Accordingly, the recipients of the green list would then be able to reply back to any of the other recipients in the green list who may be in the TO, CC, and BCC fields. Those recipients who are not in the green list would not recognize that email address have been included in the BCC field and would only see those recipients who are in the TO and CC fields.

For example, the user of the communication device 210a may utilize client application 240 to prepare an email address and to input email addresses in address fields. The user may desire to enter some email addresses in the TO, CC, and BCC fields. The BCC field allows any email addresses therein to remain private. However, the user desires for those in the green list to be able to recognize one another and to respond to one another, regardless of whether their email addresses have been entered in the TO, CC, and BCC fields. The server application 250 of the email server 230 communicates with the client application 240 (of the sender's communication device 210a) to transmit (and process) the email message to the desired recipients (e.g., on the communication devices 210b, 210c, and 210d). The recipients of the email message are able to view the email addresses of other recipients according to the settings of the sender. For example, recipients who are not designated on the green list can only view email addresses of recipients who are in the TO and CC fields, but cannot view any email addresses in the BCC field. In accordance with exemplary embodiments, those recipients in the green list can view the email addresses of other recipients in the green list who are in the TO, CC, and BCC fields. For recipients both on the green list and in the BCC field, being on the green list allows these BCCed green list recipients to reply all to the email message, which accordingly replies to all other recipients of the email message who are on the green list.

Further, in accordance with exemplary embodiments, the email processing of the client application 240 and/or the server application 250 allows recipients to choose to reply or forward the email message based on the individual recipient's green list and red list. The red list is a list of recipients who cannot visibly recognize other recipients in the red list. For example, A may send an email message to B, C, D and E. There may be a case where recipient B has set C, D, or E in his red list. In which case, when the recipient B replies to all, the individual email addresses of C, D, or E (whoever is in B's individual red list) will not be seen by C, D, or E of recipient B's red list. In accordance with exemplary embodiments, the individual red list and green list can be respected during the entire cycle of a given email's processing. Exemplary embodiments allow an email message to be sent and processed based on the sender's green list and red list. Also, exemplary embodiments allow a recipient to reply and forward the email message for processing based on the recipient's green list and red list.

Various options may be used to designate recipients of the green list in accordance with exemplary embodiments. For example, in advance and/or at the time of composing an email message, the sender may designate email addresses for the green list that should be given visibility privileges. Also, the sender may set up multiple distinct green lists according to exemplary embodiments. Furthermore, each distinct green list can be separate from other green lists that the user may create.

Figure 3:
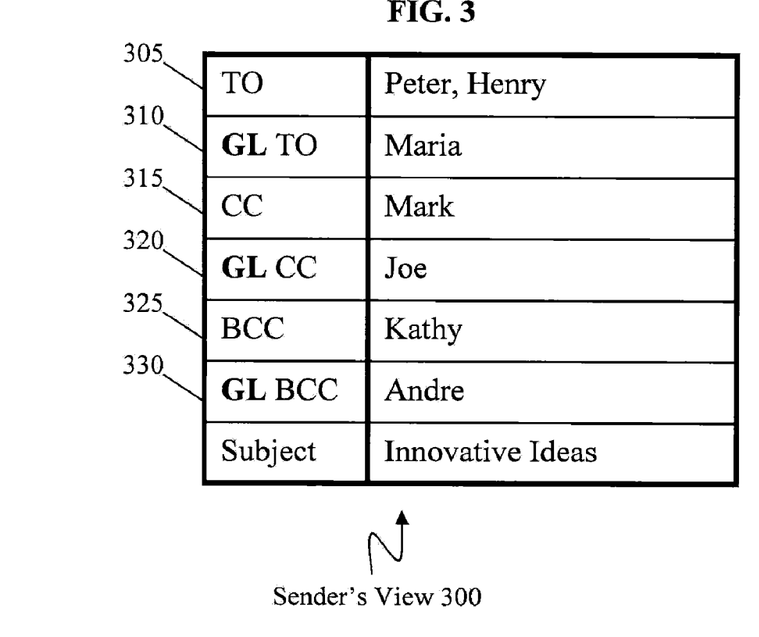
FIG. 3 illustrates an example of a sender's view in accordance with exemplary embodiments.

FIG. 3 illustrates an example of a sender's view 300 in accordance with exemplary embodiments. The sender may select an option to include additional green list fields, such as fields 310, 320, and 330. The sender may input email addresses in the green list fields 310, 320, and 330. The green list field 310 corresponds to the TO field, and everyone can view email addresses input in the green list field 310. The green list field 320 corresponds to the CC field, and everyone can view email addresses input in the green list field 320. The green list field 330 corresponds to the BCC field, and only other recipients designated in the green list can view email addresses in the green list field 330. From the perspective of those recipients who are not on the green list, the green list field 330 operates like a normal BCC field.

In accordance with exemplary embodiments, everyone in a green list can see each other, which means the each recipient in the green list knows that they are given additional privileges. These additional privileges are not given to recipients in fields 305, 315, and 325 (respectively, TO, CC, and BCC fields).

Figure 4:
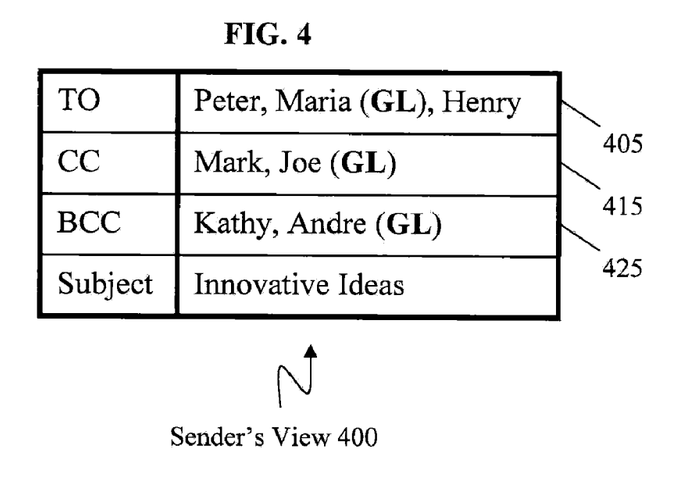
FIG. 4 illustrates an example of a sender's view in accordance with exemplary embodiments.

FIG. 4 illustrates an example of a sender's view 400 in accordance with exemplary embodiments. Instead of having the additional green list fields 310, 320, and 330 for the sender to input email addresses, the sender may add a suffix or prefix (GL) to the email address to designate a recipient as part of the green list. Designations for the green list are not limited to a prefix or suffix but may include any addition to any individual component of an email address may be added. The sender's view 400 in FIG. 4 shows fields 405, 415, and 425 in which a sender may input (GL) behind (or in front of) the email addresses that are to be designated as part of the green list.

It is understood that exemplary embodiments are not limited to using a suffix or prefix or using additional fields to designate green list recipients. In accordance with exemplary embodiment, the client application 240 may be configured to include a green list option under a file pull-down, e.g., of a web browser. The sender may highlight an email address to be designated as part of the green list, and the sender may click on the green list option under the file pull-down to include that email address in the green list. Also, the client application 240 is configured to allow the user to highlight an email address that is to be designated as part of the green list, and the user can right click to view a green list option. The user can select the green list option to designate the highlighted email address as part of the green list.

In accordance with exemplary embodiments, there are many options for designating an email address of a recipient as part of a green list, and exemplary embodiments are not limited to the illustrations discussed herein.

Figure 5:
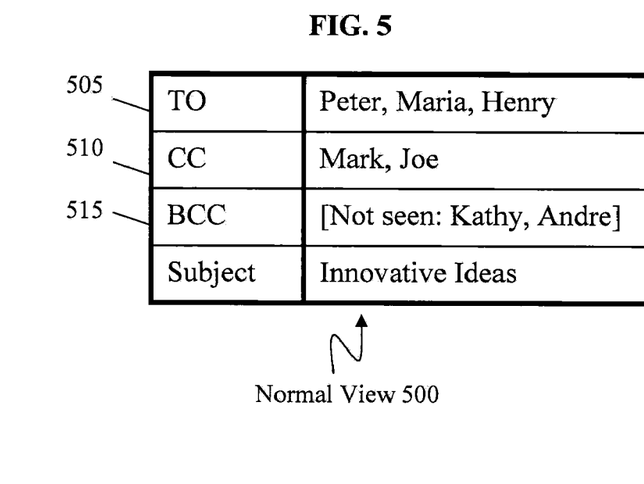
FIG. 5 illustrates an example of a normal view that would be seen by recipients who are not on a green list.

FIG. 5 illustrates an example of a normal view 500 that would be seen by recipients who are not on the green list. Field 505 shows a normal TO field having email addresses. Field 510 shows a normal CC field having email addresses. Field 515 is blank and would not be seen. Moreover, any email addresses that a sender may input in a BCC field that corresponds to the field 515 are not seen in the normal view 500.

Figure 6:
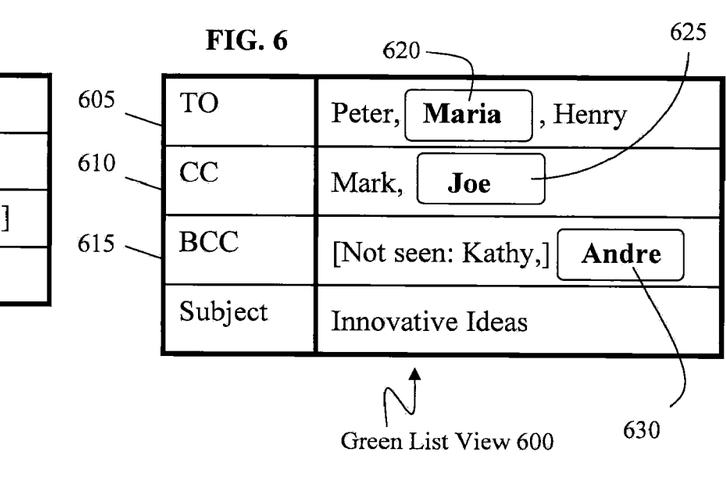
FIG. 6 illustrates an example of a green list view as seen by recipients who are on the green list in accordance with exemplary embodiments.

FIG. 6 illustrates an example of a green list view 600 as seen by recipients who are on the green list in accordance with exemplary embodiments. In the green list view 600, field 605 shows the email addresses for Peter, Henry, and Maria in the TO field, and field 605 shows a green list box 620 to indicate that Maria is in the green list according to exemplary embodiments. Those recipients who are not in the green list do not see the green list box 620 in the normal view 500.

Field 610 shows the email addresses for Mark and Joe in the CC field, and field 610 shows a green list box 625 to indicate that Joe is in the green list according to exemplary embodiments. Those recipients who are not in the green list do not see the green list box 625 in the normal view 500.

Field 615 is blank and does not show any email addresses for normal recipients. The green list recipients do not seek Kathy because she is not in the green list. However, for recipients on the green list, field 615 shows a green list box 635 to indicate that Andre is on the green list, and only other green list recipients (and the sender) can see the green list box 630. For each recipient who has been designated to be in the green list by the sender, there can be a signal to alert the green list recipients of other green list recipients. For example, the green list boxes 620, 625, and 630 may be a particular color or shape or may be highlighted or bolded so that the recipients on the green list can recognize each other. Also, an audible signal may be heard by the green list recipients.

Further, utilizing the client application 240, a user may create a list in which recipients on the list are restricted from viewing other recipients on the restricted list in accordance with exemplary embodiments. For the sake of explanation, this list may be called a red list. Moreover, regardless of what address fields (such as TO, CC, or BCC fields) the recipients are typed in of an email composure window, email addresses in the user defined red list cannot see each other.

Figure 7:
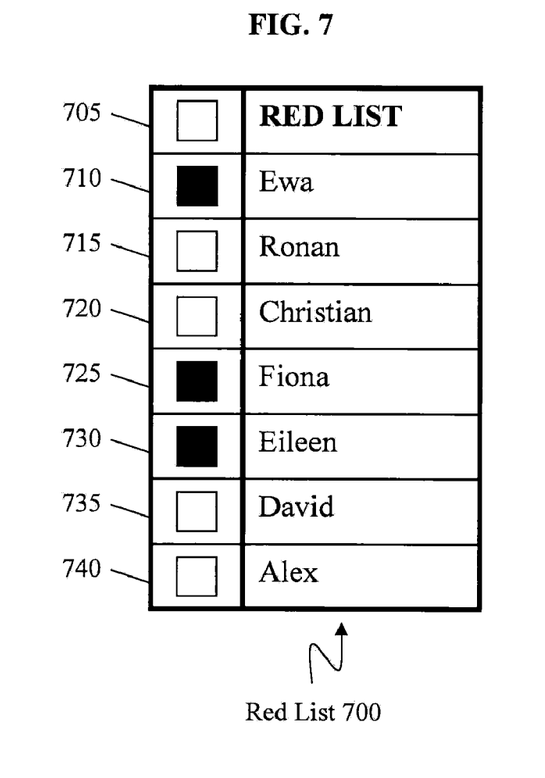
FIG. 7 illustrates an example of a red list in which names may be selected to be included in the red list in accordance with exemplary embodiments.

FIG. 7 illustrates an example of a red list 700 in which names may be selected to be included in the red list 700 in accordance with exemplary embodiments. There are various ways to populate the red list 700. For example, a user may input names in advance into a red list, and/or the client application 240 may be configured to inquire whether any names (e.g., email addresses) in email address fields should be included in a red list (or green list). For example, the client application 240 and/or the server application 250 may parse a contact lists and inquire to the user whether any names should be included in a red list (or green list). Also, in response to the user typing email addresses for an email, the client application 240 and/or the server application 250 may inquire whether any names should be included in a red list or green list.

In accordance with exemplary embodiments, the client application 240 can also parse the body of an email message to check whether names (email addresses) in a forwarded email message or a reply email message are included in the red list of the user. If the client application 240 recognizes restricted email addresses in a forwarded email message or a reply email message, the client application 240 alerts the user. Accordingly, the user can remove any restricted email addresses.

In FIG. 7, the red list 700 shows fields 710, 715, 720, 725, 730, 735, and 740, all of which contain names of respective recipients who can be selected for inclusion in the red list. Field 705 is a select all, and by selecting field 705 each name in fields 710, 715, 720, 725, 730, 735, and 740 are included in the red list. The user may desire to keep the red list 700, and the user has the option of storing the red list 700. Alternatively, the user may only utilize the red list 700 for a single email message and may not desire to store it.

Figure 8:
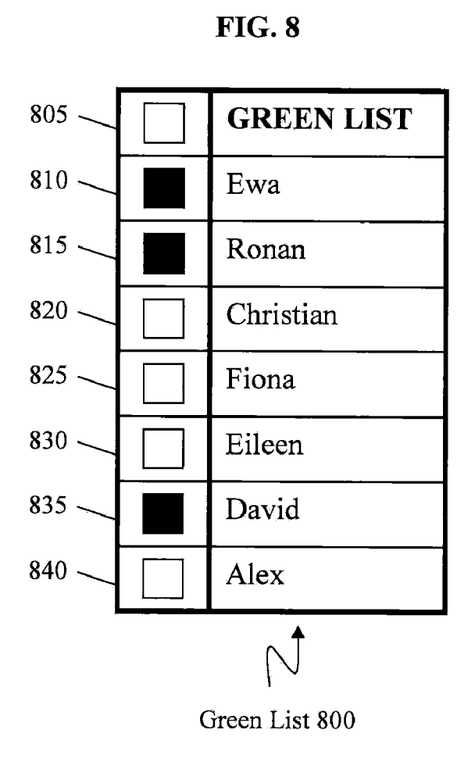
FIG. 8 illustrates an example of a green list in which names may be selected to be included in a green list in accordance with exemplary embodiments.

FIG. 8 illustrates an example of a green list 800 in which names may be selected to be included in the green list in accordance with exemplary embodiments. The green list 800 shows fields 810, 815, 820, 825, 830, 835, and 840, all of which contain names of respective recipients who can be selected for inclusion in the green list. Field 805 is a select all. The user may desire to keep the green list 800, and the user has the option of storing the green list 800. Alternatively, the user may only utilize the green list 800 for a single email message and may not want to store it.

Figure 9:
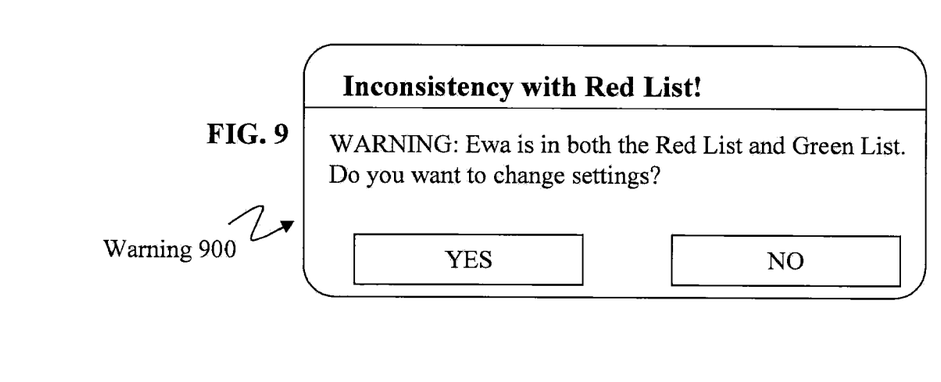
FIG. 9 illustrates a warning that may display to the user, so that the user can be alerted about inconsistencies.

A case may arise where a user has included names in both a red list and green list. For example, in one case, the user may include Ewa in field 710 of the red list 700 and also include Ewa in field 810 of the green list. If such a conflict arises, the client application 240 and/or the server application 250 would alert the user to the conflict. For example, FIG. 9 illustrates a warning 900 that may display to the user, so that the user can be alerted about the inconsistency. In one case, the user may have previously stored the red list 710 and the user may be designating names (like in FIGS. 3 and 4) for the green list, if the client application 240 and/or server application 250 detect a conflict, the user would be warned of the conflict.

The red list 700 and the green list 800 are only meant as examples, and there are many ways in which the client application 230 and/or server application 250 may implement the red list and green list. Further, in accordance with exemplary embodiments, the client application 230 and/or server application 250 allows a user to define (or set) expiration dates or validity dates with date ranges for the red and green lists. The expiration dates and validity dates may be set for each and every red list or green list that the user creates. After a set date expires, the rules for a particular green list or red list may cease to be in effect or may come into effect. Also, the client application 230 and/or server application 250 allows a user to set a reminder to remind the user to change a certain setting pertaining to a certain red list or green list. The reminder may be set when creating the red or green list or the reminder may be set anytime after creation of the red or list.

Also, the user may have multiples red lists, which may contain mutual email addresses (in some cases). For example, in one red list five recipients should not see each other, while in another red list twenty recipients should not see each other, and so forth. Even if a restricted recipient's email address is in the body of an email message and another restricted recipient's email address is in an address field (such as TO or CC), the client application 240 (and/or server application 250) can recognize that two restricted email addresses are present. Accordingly, the user is alerted of the two restricted recipients. Also, the restricted recipients' email addresses may be highlighted, bolded, encapsulated, etc., so that the user can visibly recognize the restricted recipients' email addresses. Additionally, a window may appear (similar to the warning 900 shown in FIG. 9) on the display screen of the user to alert the user, and/or an audible sound can alert the user. Indeed, the user can set various preferences for being alerted about recipients in the red list. For example, if the user is alerted with a warning display, e.g., similar to the warning 900 in FIG. 9, the user may select yes to be directed to customizing settings where the user can make desired changes to a red list or green list.

The client application 240 and/or the email server 250 can store countless red lists and green lists for a user such on the communication device 210a and the email server 230.

For illustrative purposes only, examples of various situations are provided below. In one situation, user A (utilizing communication device 210a) may send an email to three different individuals as shown below:

To: X, Y
Bcc: Z.

In other words, X and Y are input as recipients in the TO field, but Z is input in Bcc field. Although user A included X and Y in the TO field, user A does not mind X knowing that Z was BCCed. Also, Z does not mind being known my X. In accordance with exemplary embodiments, the user A can employ the green list functionality of the client application 240, such that Z can use the reply to all function to send an email response to both user A and X but not to Y, as intended by sender A. The presence of Z is still unknown to Y.

In another situation, user A may send an email to six different individuals as shown below:

TO: B, C
CC: O, P
Bcc: X, Y.

User A does not want B and O to know that X and Y are BCCed. However, user A wants C and P to know that X and Y are BCCed. In accordance with exemplary embodiments, user A can employ the green list functionality of the client application 240. User A also wants to give X and Y privileges of using the reply to all function to sending replies to the original email from user A and wants X and Y to be able to reply to C & P along with A. X and Y are still unknown to B and O.

In yet another situation, user A may send an email to four different individuals W, X, Y, and Z all in BCC fields. However, user A wants W and X to know that Z was BCCed too and vice versa. While at the same time, user A keeping W, X, and Z unknown to Y and vice versa. Utilizing the client application 240, user A may designate W, X, and Z as recipients on a green list. Accordingly, exemplary embodiments allow for two-way communications among BCCed recipients.

In an additional situation, user A may send an email to the individual below:

TO: X, Y, Z
CC: 1, 2, 3
BCC: E, F, J

Z and 3 are given privileges to see E, F, and J, but X, Y, 1, and 2 are kept unaware that Z and 3 have these privileges to see who are the BCCed recipients, in accordance with exemplary embodiments.

From the perspective of X and Y, Z is just one of the recipients in the TO field.

From the perspective of 1 and 2, 3 is just one of the recipients in the CC field. To X, Y, 1, and 2, these additional privileges of the green list do not appear.

However, from the perspective of Z and 3, both Z and 3 can see that they each are given these privileges in accordance with exemplary embodiments. Likewise, E, F, and J recognize that Z and 3 can see E, F, and J in the BCC field.

Figure 10:
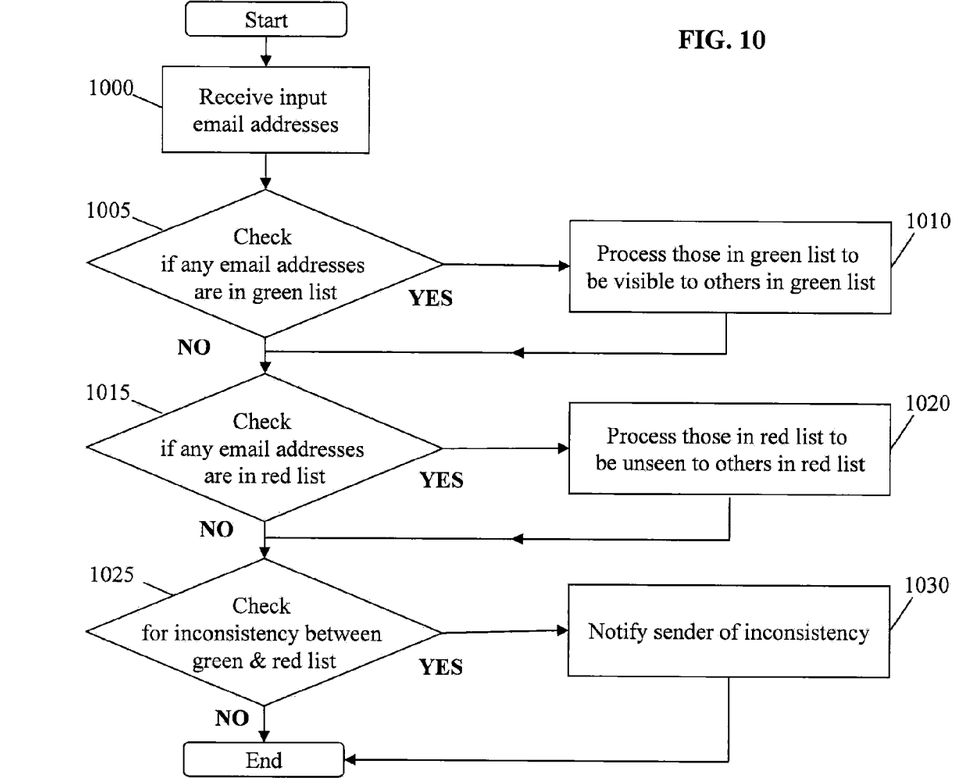
FIG. 10 illustrates a flow chart of privileged and restricted email processing in accordance with exemplary embodiments.

FIG. 10 illustrates a flow chart of privileged (green list) and restricted (red list) email processing in accordance with exemplary embodiments. The email processing may occur when creating a new email message, forwarding an email message, replying to an email message, etc. Email addresses input by the sender via the client application 240 are received at 1000. The client application 240 and/or the server application 250 checks if any of the email addresses are in a green list at 1005. In response to any emails being in the green list, the client application 240 and/or the server application 250 processes the email addresses in the green list to be visible to others in the green list at 1010.

In response to no email addresses being in the green lists or in response to operation 1010, the client application 240 and/or the server application 250 checks if any email addresses are in the red list at 1015. In response to any emails being in the red list, the client application 240 and/or the server application 250 processes the email addresses in the red list to be unseen to others in the red list at 1020.

In response to no email addresses being in the red list or in response to operation 1020, the client application 240 and/or the server application 250 checks for inconsistencies between the green list and red list at 1025.(based on Point No 2: please check my latest addition point no 2 to the idea, because of which this paragraph may be require a rewrite In response to detecting inconsistencies, the client application 240 and/or the server application 250 may check whether a priority has been set for a particular (red or green) list at 1030. During the creation of a red list and/or green list by the user or at any stage the user wishes after their creation, the user may set priorities for which list should supersede another list. For example, via the client application 240 and/or the server application 250, the user can set the red list to have first priority over the green list or every such individual list. The priority set by the user may be checked during various stages, such as the parsing and processing stages. In response to detecting that the user has set a priority to respond to inconsistencies between the red list and green list, the client application 240 and/or the server application 250 processes the email message in accordance with the priority set by the user at 1040, and the process ends.

In response to the user not having a priority set to respond to inconsistencies, the client application 240 and/or the server application 250 notifies the sender at 1035, and the process ends.

In response to detecting no inconsistencies, the process ends.

Figure 11:
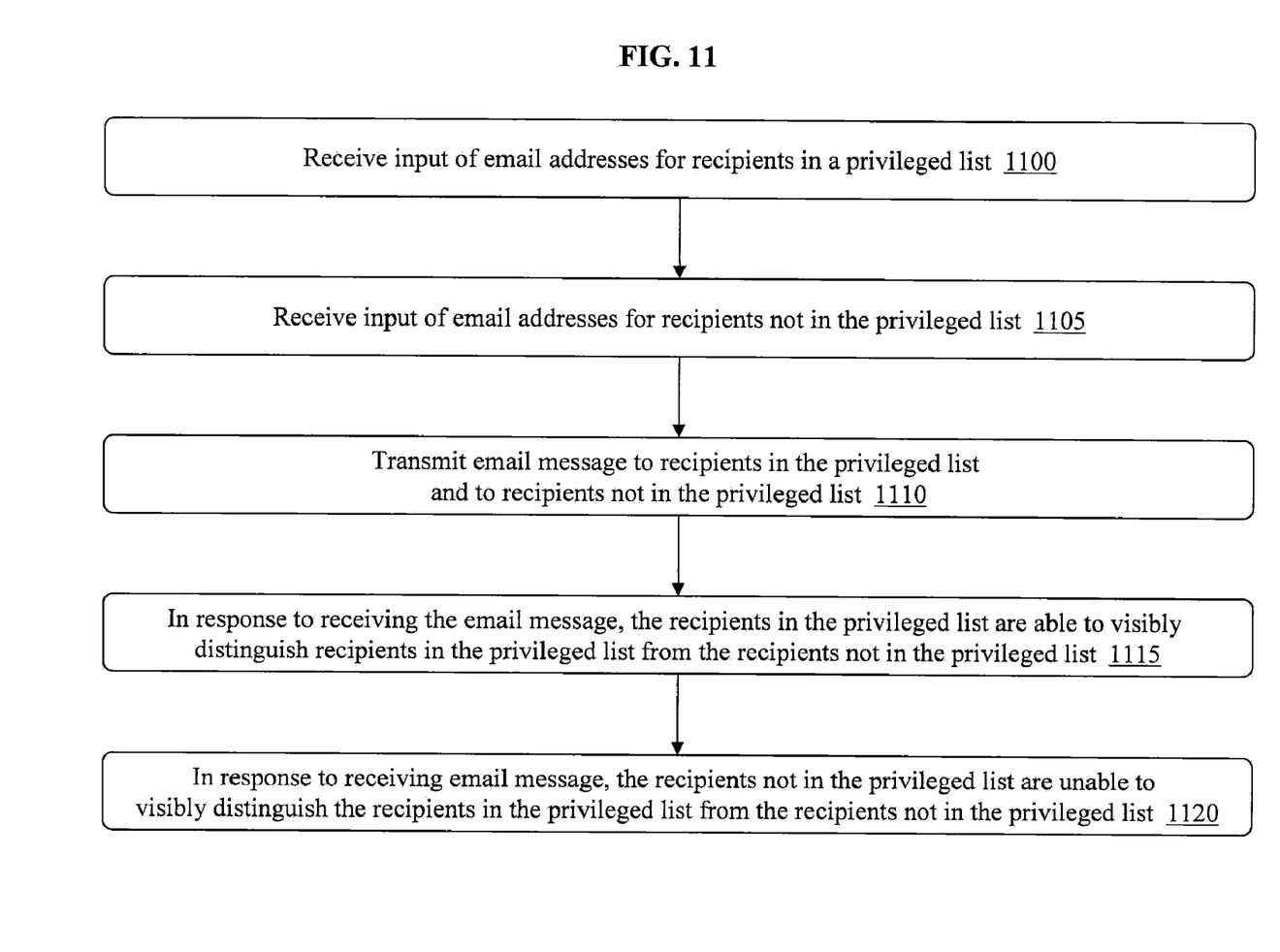
FIG. 11 illustrates a method for electronic mail (email) processing to multiple recipients based on user defined visibility settings in accordance with exemplary embodiments.

FIG. 11 illustrates a method for electronic mail (email) processing to multiple recipients based on user defined visibility settings in accordance with exemplary embodiments.

Input of email addresses for recipients in a privileged list is received at 1100.

Input of email addresses for recipients not in the privileged list is received at 1105.

An email message is transmitted to recipients in the privileged list and to recipients not in the privileged list at 1110.

In response to receiving the email message, the recipients in the privileged list are able to visibly distinguish recipients in the privileged list from the recipients not in the privileged list at 1115.

In response to receiving the email message, the recipients not in the privileged list are unable to visibly distinguish the recipients in the privileged list from the recipients not in the privileged list at 1120.

Figure 12:
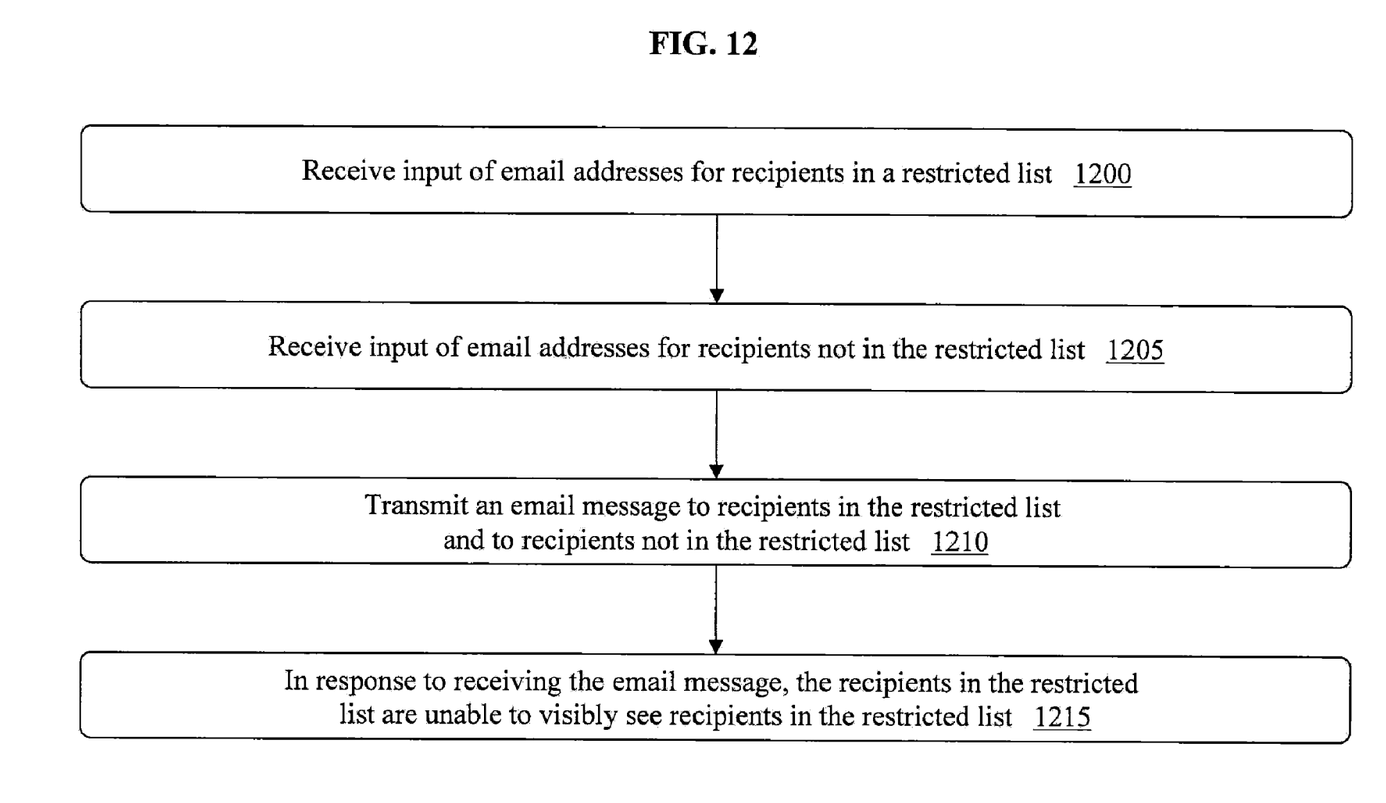
FIG. 12 illustrates a method for electronic mail (email) processing to multiple recipients based on user defined visibility settings in accordance with exemplary embodiments.

FIG. 12 illustrates a method for electronic mail (email) processing to multiple recipients based on user defined visibility settings in accordance with exemplary embodiments.

Input of email addresses for recipients in a restricted list is received at 1200.

Input of email addresses for recipients not in the restricted list is received at 1205.

An email message is transmitted to recipients in the restricted list and to recipients not in the restricted list at 1210.

In response to receiving the email message, the recipients in the restricted list are unable to visibly see recipients in the restricted list at 1215.

As understood by one skilled in the art, exemplary embodiments are not limited to illustrations discussed herein. Further, exemplary embodiments may be implemented as add-ons or plug-ins for an email client.

Additionally, in accordance with exemplary embodiments, the client application 240 and/or the server application 250 can provide the user with a count of times the red list has been put into effect. For example, the count feature may be similar to a "pop-up blocker" which gives a count of the number of pop-ups it has blocked. Accordingly, against every email identification (email address) in the red list, the client application 240 and/or the server application 250 may contain a field to capture the number of times the red list blocked processing for respective individuals. Additionally, the count feature may be implemented by a field in user settings, and by hovering over the field, the field can display a count and may also display from whom was that individual blocked/protected in all those instances. The count provides the user with a "feel-good-factor" to appreciate that utilizing the red list in accordance with exemplary embodiments has prevented the potential mistake that could have been made.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for electronic mail (email) processing to multiple recipients based on user defined visibility settings, comprising:
   receiving input of email addresses for recipients in a to recipient field;
   receiving input of email addresses for recipients in a blind carbon copy field, wherein one of the recipients in the blind carbon copy field is on a privileged list;
   identifying at least one recipient in the to recipient field as being on the privileged list, wherein recipients in the privileged list are allowed to visibly recognize others within the privileged list; and
   transmitting an email message to recipients in the to recipient field and the blind carbon copy field;
   wherein, in response to receiving the email message, the one of the recipients in the blind carbon copy field that are on the privileged list can reply only to recipients in the to recipient field that are on the privileged list and a sender of the email message by selecting a reply to all option.

2. The method of claim 1, wherein transmitting the email message to recipients comprises:
   transmitting the email message as a direct copy;
   transmitting the email message as a carbon copy (CC); and
   transmitting the email message as a blind carbon copy (BCC).

3. A computer program product, tangibly embodied on a non-transitory computer readable medium, the computer program product including instructions for causing a computer to execute a method for electronic mail (email) processing to multiple recipients based on user defined visibility settings, comprising:
   receiving input of email addresses for recipients in a to recipient field;
   receiving input of email addresses for recipients in a blind carbon copy field, wherein one of the recipients in the blind carbon copy field is on a privileged list;
   identifying at least one recipient in the to recipient field as being on the privileged list, wherein recipients in the privileged list are allowed to visibly recognize others within the privileged list; and
   transmitting an email message to recipients in the to recipient field and the blind carbon copy field;
   wherein, in response to receiving the email message, the one of the recipients in the blind carbon copy field that are on the privileged list can reply only to recipients in the to recipient field that are on the privileged list and a sender of the email message by selecting a reply to all option.

4. The computer program product of claim 3, wherein transmitting the email message to recipients comprises:
   transmitting the email message as a direct copy;
   transmitting the email message as a carbon copy (CC); and
   transmitting the email message as a blind carbon copy (BCC).

* * * * *